US011068856B2

(12) United States Patent
Kline et al.

(10) Patent No.: US 11,068,856 B2
(45) Date of Patent: Jul. 20, 2021

(54) BIOMETRIC DATA BASED SCHEDULING

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/398,473

(22) Filed: Apr. 30, 2019

(65) Prior Publication Data

US 2020/0349525 A1 Nov. 5, 2020

(51) Int. Cl.
G06Q 10/00 (2012.01)
G06Q 10/10 (2012.01)

(52) U.S. Cl.
CPC .................. G06Q 10/1095 (2013.01)

(58) Field of Classification Search
None
See application file for complete search history.

(56) References Cited

U.S. PATENT DOCUMENTS

| | | | |
|---|---|---|---|
| 7,136,861 B1 * | 11/2006 | Sinclair | G06F 16/2255 |
| 7,847,815 B2 * | 12/2010 | Patel | H04N 7/15 |
| | | | 348/14.08 |
| 8,768,864 B2 | 7/2014 | Kane-Esrig | |
| 9,615,060 B1 * | 4/2017 | Hodge | G06K 9/00771 |
| 10,326,760 B2 * | 6/2019 | Fitterer | H04L 63/0876 |
| 2005/0132290 A1 * | 6/2005 | Buchner | G06F 3/011 |
| | | | 715/702 |
| 2006/0087555 A1 * | 4/2006 | Boyd | H04N 7/15 |
| | | | 348/14.09 |

(Continued)

FOREIGN PATENT DOCUMENTS

WO 2015179861 A1 11/2015

OTHER PUBLICATIONS

Maria Frank, Ghassem Toghi, Haisong Gu, and Renate Fruchter (Engagement Detection in Meetings, Aug. 2016). (Year: 2016).*

(Continued)

*Primary Examiner* — Hafiz A Kassim
(74) *Attorney, Agent, or Firm* — Cantor Colburn LLP; Tihon Poltavets

(57) ABSTRACT

Embodiments include methods, systems and computer program products for scheduling a meeting based upon n state of being of a meeting participant. Aspects include receiving a request to schedule the meeting with the meeting participant, the request including a desired state of being of the meeting participant and a desired time period of the meeting. Aspects also include obtaining a calendar of the meeting participant for the time period and determining an expected state of being of the meeting participant during the desired time period based at least in part upon meeting information for one or more scheduled meetings on the calendar during the desired time period. Aspects further include identifying a meeting time during the desired time period, wherein the expected state of being for of the meeting participant at the meeting time is the same as the desired state of being.

9 Claims, 5 Drawing Sheets

(56) References Cited

U.S. PATENT DOCUMENTS

| | | | | |
|---|---|---|---|---|
| 2006/0167784 | A1* | 7/2006 | Hoffberg | G06Q 20/401 705/37 |
| 2006/0242154 | A1* | 10/2006 | Rawat | G06F 16/168 |
| 2006/0259755 | A1* | 11/2006 | Kenoyer | G06F 21/32 713/1 |
| 2007/0188597 | A1* | 8/2007 | Kenoyer | H04N 7/147 348/14.08 |
| 2009/0123035 | A1* | 5/2009 | Khouri | H04N 7/147 382/115 |
| 2010/0205541 | A1* | 8/2010 | Rapaport | G06F 16/285 715/753 |
| 2014/0047560 | A1* | 2/2014 | Meyer | G06F 21/10 726/28 |
| 2014/0067455 | A1* | 3/2014 | Zhang | G06Q 10/109 705/7.24 |
| 2014/0089024 | A1* | 3/2014 | Mason | G06Q 10/06 705/7.12 |
| 2014/0229610 | A1* | 8/2014 | Shen | G06F 9/505 709/224 |
| 2015/0067047 | A1* | 3/2015 | Fu | H04L 67/16 709/204 |
| 2015/0356516 | A1* | 12/2015 | Kagan | G06Q 10/1095 705/7.19 |
| 2016/0063449 | A1* | 3/2016 | Duggan | G06Q 10/1095 705/7.19 |
| 2016/0124908 | A1* | 5/2016 | Cecchi | G06F 40/30 704/9 |
| 2016/0232244 | A1* | 8/2016 | Liu | G06F 3/011 |
| 2016/0292585 | A1 | 10/2016 | Kozloski et al. | |
| 2016/0307166 | A1* | 10/2016 | Bradley | G06F 3/04842 |
| 2016/0358126 | A1* | 12/2016 | Bostick | G06Q 10/1095 |
| 2017/0178048 | A1 | 6/2017 | Ghotbi et al. | |
| 2017/0200112 | A1* | 7/2017 | Liu | G06Q 10/063114 |
| 2018/0039931 | A1* | 2/2018 | Dotson | H04L 67/10 |
| 2018/0046957 | A1* | 2/2018 | Yaari | G06Q 10/1095 |
| 2018/0189743 | A1* | 7/2018 | Balasubramanian | G06Q 10/1095 |
| 2018/0278605 | A1* | 9/2018 | Fitterer | G06Q 10/109 |
| 2018/0341926 | A1* | 11/2018 | Gentzkow | G06Q 10/06311 |
| 2019/0279164 | A1* | 9/2019 | Byron | G06F 16/2457 |
| 2019/0306550 | A1* | 10/2019 | Thorn | H04N 21/44222 |
| 2019/0334907 | A1* | 10/2019 | Rodden | G06Q 10/063116 |

OTHER PUBLICATIONS

Cook, Karla "14 of the Best Meeting Scheduler Tools to Organize Your day", retrieved at: https://blog.hubspot.com/marketing/meeting-scheduler-tools-more-productive#sm.000gxcidvi87coi10bm22gafjoazl; downloaded Feb. 12, 2021; 25 pgs.

Quora "What are the viable web based options for meeting scheduling that syncs with Google Calendar?", retrieved at: https://www.quora.com/What-are-the-viable-web-based-options-for-meeting-scheduling-that-syncs-with-Google-Calendar; retrieved on: Feb. 12, 2021; 6 pgs.

Sugumaran, M., et al. "A new approach for meeting scheduler using A*-algorithm", Abstract Only; retrieved at: https://ieeexplore.ieee.org/document/1273357; published in TENCON 2003. Conference on Convergent Technologies for Asia-Pacific Region; date of conference: Oct. 15-17, 2003; added to IEEE on Mar. 15, 2004; 3 pgs.

* cited by examiner

BIOMETRIC DATA BASED SCHEDULING

BACKGROUND

The present disclosure relates generally to the scheduling of meetings and more specifically to scheduling meetings based upon a state of being of a meeting participant.

Many people attend various meetings as part of their typical daily activities. These meetings include, but are not limited to, training sessions, status meetings, customer reviews, performance reviews, etc. Each meeting includes at least two participants that each has a different role in the meeting. For example, in a performance review meeting, the participant can be either a boss giving a review or the employee receiving the review.

SUMMARY

In accordance with an embodiment, a method for scheduling a meeting based upon a state of being of a meeting participant is provided. The method includes receiving a request to schedule the meeting with the meeting participant, the request including a desired state of being of the meeting participant and a desired time period of the meeting. The method also includes obtaining a calendar of the meeting participant for the time period and determining an expected state of being of the meeting participant during the desired time period based at least in part upon meeting information for one or more scheduled meetings on the calendar during the desired time period. The method further includes identifying a meeting time during the desired time period, wherein the expected state of being for of the meeting participant at the meeting time is the same as the desired state of being.

In accordance with another embodiment, a calendaring system for scheduling a meeting based upon a state of being of a meeting participant is provided. The calendaring system includes a processor in communication with one or more types of memory, the processor configured to receive a request to schedule the meeting with the meeting participant, the request including a desired state of being of the meeting participant and a desired time period of the meeting. The processor is also configured to obtain a calendar of the meeting participant for the time period and determine an expected state of being of the meeting participant during the desired time period based at least in part upon meeting information for one or more scheduled meetings on the calendar during the desired time period. The processor is also configured to identify a meeting time during the desired time period, wherein the expected state of being for of the meeting participant at the meeting time is the same as the desired state of being.

In accordance with a further embodiment, a computer program product for scheduling a meeting based upon a state of being of a meeting participant includes a non-transitory storage medium readable by a processing circuit and storing instructions for execution by the processing circuit for performing a method. The method includes receiving a request to schedule the meeting with the meeting participant, the request including a desired state of being of the meeting participant and a desired time period of the meeting. The method also includes obtaining a calendar of the meeting participant for the time period and determining an expected state of being of the meeting participant during the desired time period based at least in part upon meeting information for one or more scheduled meetings on the calendar during the desired time period. The method further includes identifying a meeting time during the desired time period, wherein the expected state of being for of the meeting participant at the meeting time is the same as the desired state of being.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
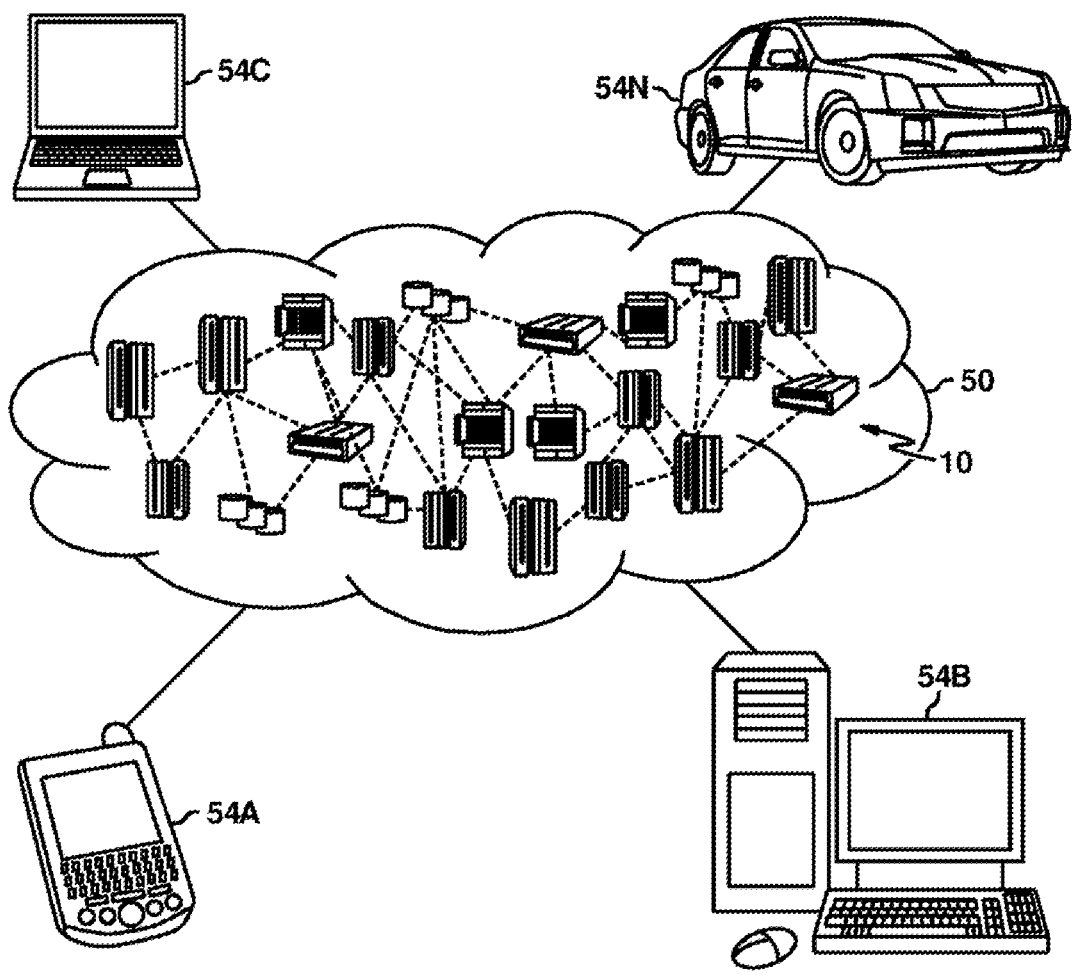
FIG. 1 depicts one embodiment of an example cloud computing environment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the calendar system discussed can be implemented in a cloud computing environment. For example, the calendar server can be implemented via a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 2:
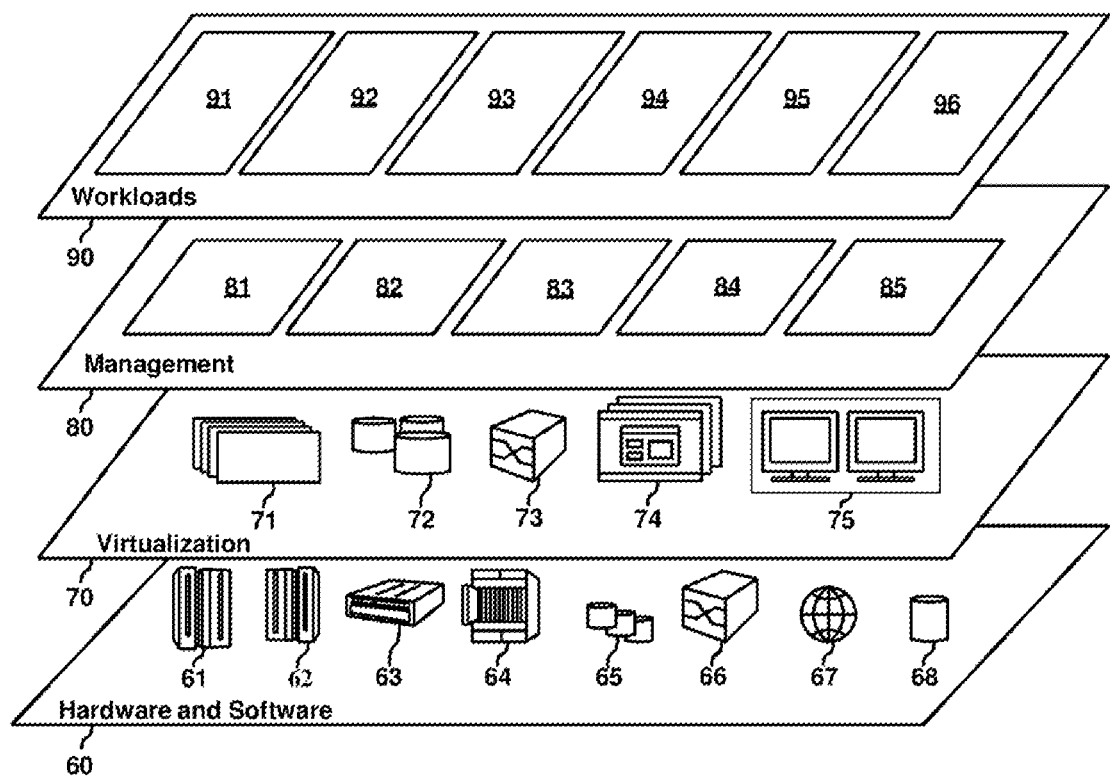
FIG. 2 depicts one embodiment of example abstraction model layers

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar processing 96. Calendar processing 96 is configured to implement the functionality described above with respect to FIG. 3-5.

Turning now to an overview of technologies that are more specifically relevant to aspects of the invention, which are related to calendaring systems for scheduling a meeting based upon a state of being of a meeting participant. In exemplary embodiments, the state of being of a meeting participant includes an emotional state of the meeting participant, such as happy, sad, anxious, distracted, nervous, or the like. In general, the efficiency and quality of participation of a participant in a meeting depends on a mental state of the participant during or before the meeting. Often, other meetings or events that an individual is participating in will affect their ability to focus and participate in a meeting. For example, if an individual has an important meeting, such as receiving their performance review or giving a presentation to a superior, the individual is likely to be distracted an unable to focus and participate in a meeting that is scheduled before the important meeting. In exemplary embodiments, a calendaring system is provided that determines an expected state of being of a meeting participant and utilizes the expected state of being to select an optimal time for a meeting. As used herein, the term state of being generally refers to an individual's ability to focus and participate in a meeting. In exemplary embodiments, the state of being of a meeting participant can be changed after a meeting in addition to before an important meeting. For example, if an individual sits through a two-hour long status meeting, the individual may become sleepy or tried, mentally upset, or frustrated. As a result, the individual's state of being after the status meeting ends may not be ideal for some meeting types.

Figure 3:
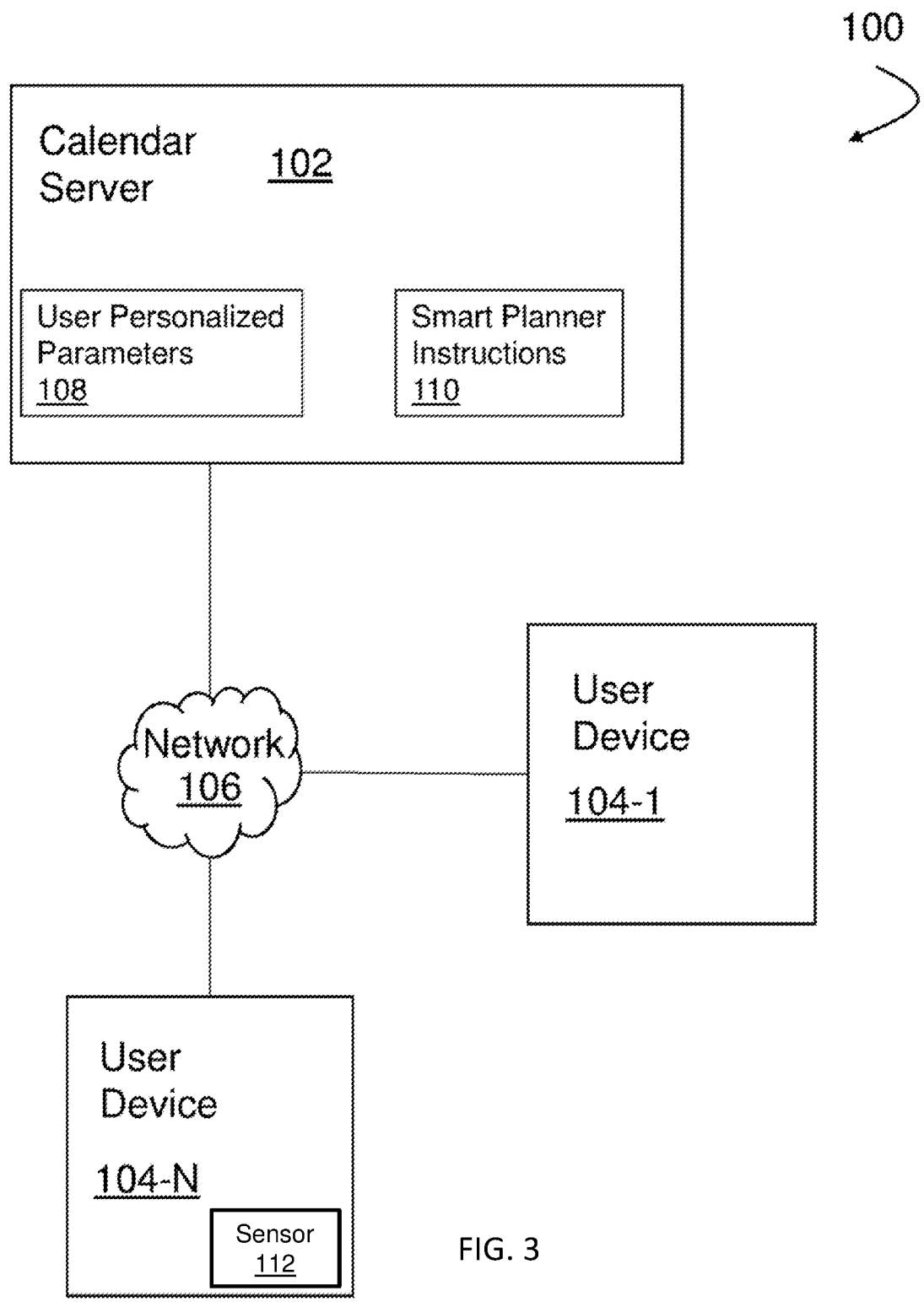
FIG. 3 is a block diagram of a calendaring system in accordance with an exemplary embodiment.

Referring now to FIG. 3, a block diagram of one embodiment of an example calendaring system 100 is shown. The calendaring system 100 includes a server 102 which is coupled to a plurality of user devices 104-1 . . . 104-N via a network 106. Each of the user devices 104 can be implemented as any device capable of displaying a calendar with events. For example, each of the user devices 104 can be implemented as a desktop computer, portable computer, laptop or notebook computer, netbook, tablet computer, pocket computer, smartphone, or any other suitable type of electronic device capable of displaying a calendar with events. It is to be understood that all of the user devices 104 do not need to be implemented the same. Furthermore, it is to be understood that, although only two user devices 104 are shown for purposes of explanation, more than two user devices can be used in other embodiments.

The user devices 104 are communicatively coupled to the server 102 via the network 106. The network 106 can be implemented by any number of any suitable communications topologies (e.g., wide area network (WAN), local area network (LAN), Internet, Intranet, etc.). The communications network 106 can include one or more servers, networks, or databases, and can use a particular communication protocol to transfer data between the user devices 104 and the calendar server 102. The communications network 106 can include a variety of types of physical communication channels or "links." The links can be wired, wireless, optical, or any other suitable media. In addition, the communications network 102 can include a variety of network hardware and software for performing routing, switching, and other functions, such as routers, switches, or bridges. Furthermore, it is to be understood that although user device 104-1 and user device 104-N are depicted in the example of FIG. 1 as being communicatively coupled to the server 102 via the same network 106, for purposes of illustration, the user devices 104 can be coupled to the server 102 via separate networks, in other embodiments. For example, in some embodiments, user device 104-1 can be communicatively coupled to the calendar server 102 via a local area network while the user device 104-N is communicatively coupled to the server 102 via the internet.

In exemplary embodiments, the user device 104-N includes a sensor 112 that is configured to monitor one or more characteristics of a user. For example, in one embodiment, the user device 104-N is a smartwatch and the sensor 112 is configured to monitor a heart-rate of the user. In another example, the user device 104-N is a smartphone and the sensor 112 is a camera configured to capture images of the user, which are analyzed using known techniques to determine a stress level of the user.

The calendar server 102 is configured to execute smart planner instructions 110 which enable the calendar server 102 to adapt to each user's respective preferences to provide personalized recommendations/actions for helping a user improve the efficiency of the calendar server 102. In particular, the calendar server 102 enables each user to create or modify a profile to include a set of personalized parameters includes one or more objects or criteria, such as, but not limited to, time of day, the day of the week, length of the meeting, topic, people involved, etc. The personalized parameters also include specific values for each of the criteria. For example, a user may specify the example value of between 10 AM to 1 PM for the criteria "time of day." By specifying this example time period, the user has identified that the user prefers to have meetings during that time period. Similarly, a user can specify preferred days of the week in the "day of the week" criteria.

In addition, the user can assign weights to each of the criteria to thereby indicate the relative importance of each criterion for that specific user. For example, the day of the week may be more important to an example user than time of day. Thus, that user could assign a higher weight to the "day of the week" criteria than to the "time of day" criteria. There are many ways of assigning weights to indicate relative importance. For example, each criterion may be given a value on a scale of numbers such as 1-10 with one end of the scale being the highest weight (e.g. 1) and the other being the lowest weight (e.g. 10). Alternatively, weights can be expressed as percentages of total value. For example, one criterion are assigned a weight of 60% and another a weight of 40% so that the total of the respective weights is 100%. It is to be understood that these examples of assigning weights are provided by way of example only and that any technique for assigning relative importance or value to the respective criteria can be implemented in the various embodiments. The calendar stores each user's personalized parameters 108 for later use. For example, each user's personalized parameters 108 can be stored together with that user's credentials, such as username, password, etc.

In exemplary embodiments, the personalized parameters 108 include information regarding the user that is used to determine an expected state of being of the user. In one embodiment, the personalized parameters 108 includes a relationship between the user and other meeting participants. For example, the personalized parameters 108 can classify an individual's relationship with the user, such as a customer, a boss, a subordinate, or the like. In another embodiment, the personalized parameters 108 includes, an impact that a certain type of meeting has on the user's state of being, which can be specified by the user or learned over time. For example, certain types of meetings, such as a meeting in which the participant is a public speaker, can have different impacts on the state of being of different individuals. When a calendar event, such as a meeting request, is received for a given user, the calendar server 102 analyzes the calendar event based on that user's personalized parameters and upon the expected state of being of the participates in the meeting request.

Figure 4:
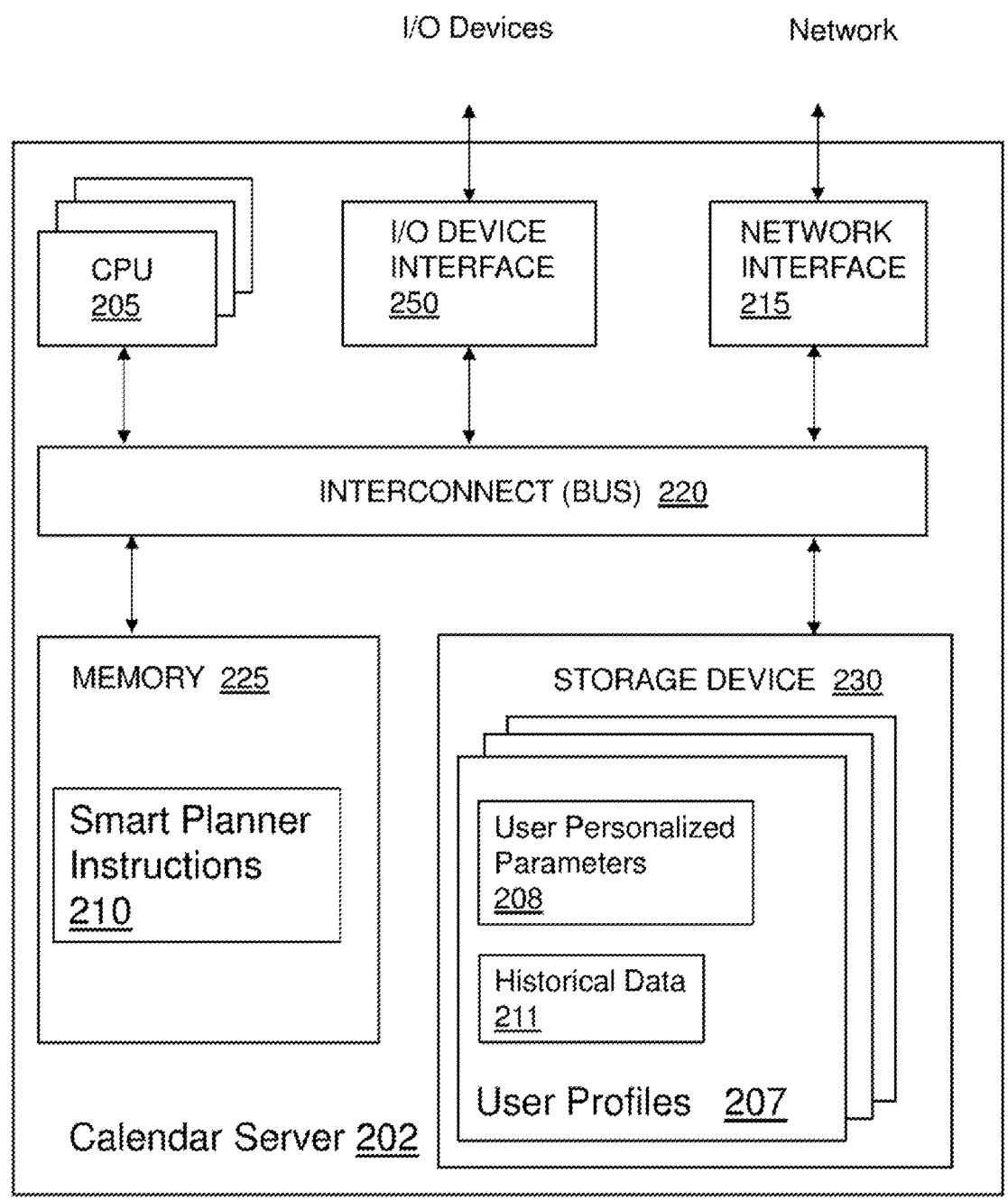
FIG. 4 is a block diagram of a calendar server in accordance with an exemplary embodiment.

Referring now to FIG. 4, a block diagram of one embodiment of an example calendar server 202 is shown. In the example shown in FIG. 4, the calendar server 202 includes a memory 225, storage 230, an interconnect (e.g., BUS) 220, one or more processors 205 (also referred to as CPU 205 herein), an I/O device interface 210, I/O devices 212, and a network interface 215. In exemplary embodiments, Each CPU 205 retrieves and executes programming instructions stored in the memory 225 and/or storage 230. The interconnect 220 is used to move data, such as programming instructions, between the CPU 205, I/O device interface 250, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the calendar server 202 via the I/O device interface 250 or via a communication network coupled to the network interface 215.

In some embodiments, the memory 225 stores smart planner instructions 210 and the storage 230 stores user profiles 207. Each user profile 207 includes user personalized parameters 208 and historical data 211. However, in various embodiments, the smart planner instructions 210 and the user profiles 207 are stored partially in memory 225 and partially in storage 230, or they are stored entirely in memory 225 or entirely in storage 230, or they are accessed over a network via the network interface 215. In exemplary embodiments, the historical data 211 includes data captured from sensors on user devices regarding a state of being of an individual, before, during and after meetings. For example, this data can include heart rate or blood pressure data captured by a smartwatch.

The smart planner instructions 210 are executed by the CPU 205. When executed, the smart planner instructions 210 cause the CPU 205 to output signals and commands to a user device, such as user devices 104 in FIG. 3, via network 215. The output signals and commands cause the user device to provide a visual and/or audio prompt to request input from the user utilizing the user device. Thus, the user device includes user interface devices such as a display screen, speakers, keyboard, mouse, keypad, touchpad, trackball, buttons, light pen, or other pointing devices. In particular, the prompts direct the user in selecting or otherwise specifying the criteria to be used by the smart planner as well as the weights for each criterion that indicate that user's preferences. The calendar server 202 received the user input from the user device via the network interface 215. These respective user personalized parameters 208 are then stored in the respective user profile 207 for that user.

The smart planner instructions 210 then cause the CPU 205 to compare the computed probability with user-defined thresholds. In particular, the calendar server 202 stores within the user-defined parameters 208 for each user, a user specified first threshold and second threshold. By comparing the computed probability to the user-defined thresholds, the calendar server 202 is able to identify a time for calendar event, as described in more detail below. In particular, the smart planner instructions 210 store processor executable instructions for various methods such as the methods shown and described hereinafter with respect to FIG. 5.

Figure 5:
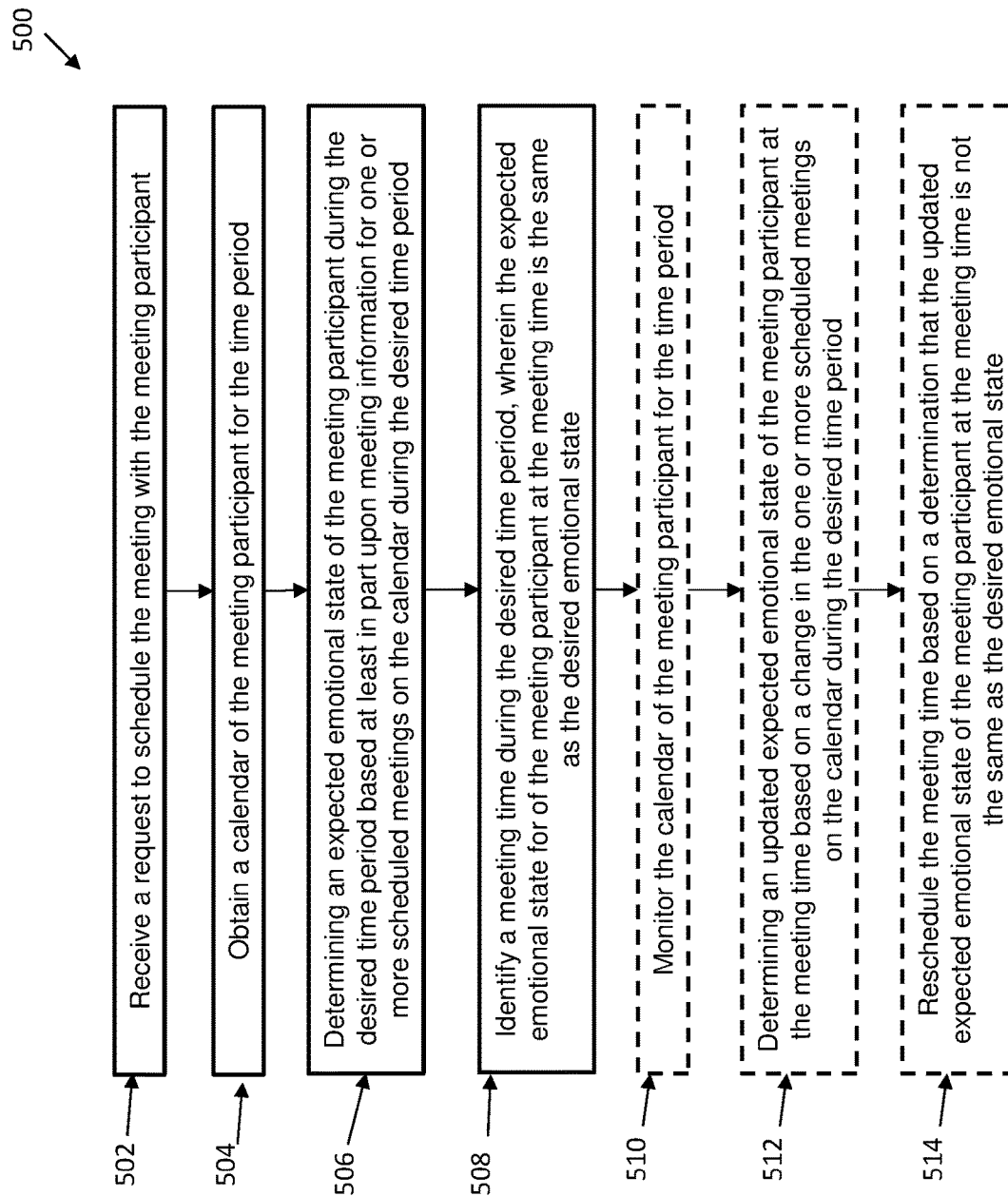
FIG. 5 is a flow diagram of a method for scheduling a meeting based upon an state of being of a meeting participant in accordance with an exemplary embodiment.

Referring now to FIG. 5, a flow diagram is shown of a method 500 for scheduling a meeting based upon a state of being of a meeting participant in accordance with an exemplary embodiment. As shown at block 502, the method 500 includes receiving a request to schedule the meeting with the meeting participant. In exemplary embodiments, the request includes a desired state of being of the meeting participant and a desired time period of the meeting. For example, the desired time period can include one or more days and a window of time during those days. In exemplary embodiments, the desired state of being includes one of distracted, partially distracted, and normal. Next, as shown at block 504, the method 500 also includes obtaining a calendar of the meeting participant for the time period. The method further includes determining an expected state of being of the meeting participant during the desired time period based at least in part upon meeting information for one or more scheduled meetings on the calendar during the desired time period, as shown at block 506. In exemplary embodiments, the expected state of being is determined at least in part upon measured biometric signals obtained from the meeting participant prior to, during, or after previous meetings. For example, such biometric signals can indicate that the meeting participant gets nervous or distracted prior to meetings in which the meeting participant is going to be making a presentation.

In exemplary embodiments, the meeting information for one or more scheduled meetings on the calendar during the desired time period includes a type of the one or more scheduled meetings and a role of the meeting participants role in the one or more scheduled meetings. For example, the meeting type can include a presentation in which the role of the participant can be the speaker or an attendee, the meeting type can be a review in which the role of the can be the person giving or receiving the review, or the like. The meeting information for one or more scheduled meetings on the calendar during the desired time period also can also include an identification of one or more additional participants in the one or more scheduled meetings. For example, the meeting can be a presentation that the participant is giving to his superiors or that the participant is attending in which they are not required to actively participate.

Continuing with reference to FIG. 5, the method 500 also includes identifying a meeting time during the desired time period, wherein the expected state of being for of the meeting participant at the meeting time is the same as the desired state of being, as shown at block 508. Optionally, the method 500 includes monitoring the calendar of the meeting participant for the time period, as shown at block 510. Next, the method 500 may include determining an updated expected state of being of the meeting participant at the meeting time based on detecting a change in the one or more scheduled meetings on the calendar during the desired time period, as shown at block 512. Further, as shown at block 514, the method 500 may include rescheduling the meeting time based on a determination that the updated expected state of being of the meeting participant at the meeting time is not the same as the desired state of being.

In exemplary embodiments, the request to schedule a meeting indicates that one or more participants of the meeting are required to attend the meeting and that one or more participants of the meeting are optional to attend. In the case where a meeting participant has an expected state of being that is not the same as the desired state of being, the meeting is not rescheduled. Rather, the meeting is removed from the calendar of the optional meeting participant.

In exemplary embodiments, the method 500 can also include capturing information regarding an actual mental state of the meeting participant during the meeting using a wearable electronic device. For example, the heart rate and/or blood pressure of a meeting participant can be captured before, during and/or after a meeting. In addition, the wearable devices will track how long it takes the meeting participant to recover from the current mental state. This captured data is used by the calendaring system to update/modify the determination of an expected state of being of the participant for future meetings that are similar to previous meetings the participant attended.

In exemplary embodiments, the involvement, inter-activeness of meeting participants during a meeting are tracked using smart devices, such as smartphone and smartwatch, and this data is correlated with the state of being of the meeting participants. The state of being can be determined based on biometric signals and audio/video captured during the meeting. Machine learning methods are used to identify how the behavior and state of being of each meeting participant change along with various other parameters. Based on historical mental state recovery pattern the calendaring system will identify how the user will recover from an expected mental state and how long it takes based on the various degree of mental state.

In exemplary embodiments, when a meeting is scheduled, the calendaring system will gather the agenda of the meeting and accordingly will find map the skills of the participants. The calendaring system will predict the mental state of the participants while attending the meeting and accordingly will suggest the best possible timing while attending the meeting when the mental state of the participants are appropriate. While scheduling any meeting, the calendaring system will also check the mental state required to attend the already scheduled meeting and impact in a mental state that the meeting will create any problem to the already meeting schedule. The calendaring system will suggest alternate meeting timing or will alert the respective participants to reschedule the already scheduled meeting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for scheduling a meeting based upon a state of being of a meeting participant, the computer implemented method comprises:

receiving a request to schedule the meeting with the meeting participant, the request including a desired state of being of the meeting participant and a desired time period of the meeting, wherein the desired state of being is an emotional state of the meeting participant;

obtaining a calendar of the meeting participant for the time period;

determining an expected state of being of the meeting participant during the desired time period based at least in part upon meeting information for one or more scheduled meetings on the calendar during the desired time period and based upon biometric data associated with the meeting participant using a wearable electronic device, wherein the wearable electronic device includes a sensor configured to capture information regarding the actual mental state of the meeting participant during the meeting;

identifying a meeting time during the desired time period, wherein the expected state of being for of the meeting participant at the meeting time is the same as the desired state of being;

scheduling the meeting at the meeting time;

monitoring the calendar of the meeting participant for the time period;

detecting a change in the one or more scheduled meetings on the calendar during the desired time period;

determining an updated expected state of being of the meeting participant at the meeting time based upon measured biometric signals obtained from the sensors of the wearable electronic device of the meeting participant prior to, during, or after previous meetings, wherein the measured biometric signals indicate the emotional state of the meeting participant; and rescheduling the meeting time based on a determination that the updated expected state of being of the meeting participant at the meeting time is not the same as the desired state of being.

2. The computer-implemented method of claim 1, wherein the meeting information for one or more scheduled meetings on the calendar during the desired time period includes a type of the one or more scheduled meetings and a role of the meeting participants role in the one or more scheduled meetings.

3. The computer-implemented method of claim 2, wherein the meeting information for one or more scheduled meetings on the calendar during the desired time period also includes an identification of one or more additional participants in the one or more scheduled meetings.

4. A computer program product for scheduling a meeting based upon a state of being of a meeting participant, the computer program product comprising:
 a storage medium readable by a processing circuit and storing instructions for execution by the processing circuit for performing a method comprising:
  receiving a request to schedule the meeting with the meeting participant, the request including a desired state of being of the meeting participant and a desired time period of the meeting, wherein the desired state of being is an emotional state of the meeting participant;
  obtaining a calendar of the meeting participant for the time period;
  determining an expected state of being of the meeting participant during the desired time period based at least in part upon meeting information for one or more scheduled meetings on the calendar during the desired time period and based upon associated with the meeting participant using a wearable electronic device, wherein the wearable electronic device includes a sensor configured to capture information regarding the actual mental state of the meeting participant during the meeting;
  identifying a meeting time during the desired time period, wherein the expected state of being for of the meeting participant at the meeting time is the same as the desired state of being;
  scheduling the meeting at the meeting time;
  monitoring the calendar of the meeting participant for the time period;
  detecting a change in the one or more scheduled meetings on the calendar during the desired time period;
  determining an updated expected state of being of the meeting participant at the meeting time based upon measured biometric signals obtained from the sensors of the wearable electronic device of the meeting participant prior to, during, or after previous meetings, wherein the measured biometric signals indicate the emotional state of the meeting participant; and
  rescheduling the meeting time based on a determination that the updated expected state of being of the meeting participant at the meeting time is not the same as the desired state of being.

5. The computer program product of claim 4, wherein the meeting information for one or more scheduled meetings on the calendar during the desired time period includes a type of the one or more scheduled meetings and a role of the meeting participants role in the one or more scheduled meetings.

6. The computer program product of claim 5, wherein the meeting information for one or more scheduled meetings on the calendar during the desired time period also includes an identification of one or more additional participants in the one or more scheduled meetings.

7. A calendaring system for scheduling a meeting based upon a state of being of a meeting participant, the system comprising a processor in communication with one or more types of memory, the processor configured to:
 receive a request to schedule the meeting with the meeting participant, the request including a desired state of being of the meeting participant and a desired time period of the meeting, wherein the desired state of being is an emotional state of the meeting participant;
 obtain a calendar of the meeting participant for the time period;
 determine an expected state of being of the meeting participant during the desired time period based at least in part upon meeting information for one or more scheduled meetings on the calendar during the desired time period and based upon associated with the meeting participant using a wearable electronic device, wherein the wearable electronic device includes a sensor configured to capture information regarding the actual mental state of the meeting participant during the meeting;
 identify a meeting time during the desired time period, wherein the expected state of being for of the meeting participant at the meeting time is the same as the desired state of being;
 schedule the meeting at the meeting time;
 monitor the calendar of the meeting participant for the time period;
 detecting a change in the one or more scheduled meetings on the calendar during the desired time period;
 determine an updated expected state of being of the meeting participant at the meeting time based upon measured biometric signals obtained from the sensors of the wearable electronic device of the meeting participant prior to, during, or after previous meetings, wherein the measured biometric signals indicate the emotional state of the meeting participant; and
 reschedule the meeting time based on a determination that the updated expected state of being of the meeting participant at the meeting time is not the same as the desired state of being.

8. The calendaring system of claim 7, wherein the meeting information for one or more scheduled meetings on the calendar during the desired time period includes a type of the one or more scheduled meetings and a role of the meeting participants role in the one or more scheduled meetings.

9. The calendaring system of claim 8, wherein the meeting information for one or more scheduled meetings on the calendar during the desired time period also includes an identification of one or more additional participants in the one or more scheduled meetings.

* * * * *